(12) United States Patent
Lim et al.

(10) Patent No.: US 11,731,540 B2
(45) Date of Patent: Aug. 22, 2023

(54) BLOWER FOR VENTILATION SEAT HAVING WARM-AIR-BLOWING FUNCTION AND VEHICULAR VENTILATION SEAT INCLUDING THE SAME

(71) Applicant: HYUNDAI TRANSYS INCORPORATED, Seosan-si (KR)

(72) Inventors: Ho Sub Lim, Hwaseong-si (KR); Sang Kyung Koh, Hwaseong-si (KR); Sun Woo Kim, Hwaseong-si (KR); Hwa Jun Lee, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 17/718,686

(22) Filed: Apr. 12, 2022

(65) Prior Publication Data

US 2022/0340058 A1    Oct. 27, 2022

(30) Foreign Application Priority Data

Apr. 21, 2021  (KR) .................. 10-2021-0051749

(51) Int. Cl.
  *F04D 29/64*  (2006.01)
  *F04D 29/28*  (2006.01)
  *F04D 29/66*  (2006.01)
  *B60N 2/56*  (2006.01)
  *F04D 29/40*  (2006.01)
  *F04D 25/08*  (2006.01)

(52) U.S. Cl.
  CPC .......... *B60N 2/5657* (2013.01); *F04D 25/08* (2013.01); *F04D 29/403* (2013.01)

(58) Field of Classification Search
  CPC ... B60N 2/5657; B60N 2/5642; B60N 2/5621
  See application file for complete search history.

(56) References Cited

U.S. PATENT DOCUMENTS

| | | | |
|---|---|---|---|
| 9,214,840 B2* | 12/2015 | Kojima | H02K 5/24 |
| 9,790,961 B2* | 10/2017 | Wu | F04D 29/282 |
| 10,240,607 B2* | 3/2019 | Wheeler | F04D 25/08 |
| 2002/0092308 A1* | 7/2002 | Bell | B60N 2/5657 62/3.7 |
| 2002/0150478 A1* | 10/2002 | Aoki | B60H 1/00457 417/44.1 |

(Continued)

FOREIGN PATENT DOCUMENTS

| CN | 102555869 A | 7/2012 |
|---|---|---|
| CN | 112319325 A | 2/2021 |

(Continued)

*Primary Examiner* — Shin H Kim
(74) *Attorney, Agent, or Firm* — NKL Law; Jae Youn Kim

(57) ABSTRACT

Proposed are a blower for a ventilation seat having a warm-air-blowing function and a vehicular ventilation seat including the same. The blower moves air supplied to the vehicular ventilation seat. The blower includes a housing having an accommodation space formed therein and including an inlet receiving air and an outlet discharging air, a motor mounted in the housing, an impeller mounted in the housing and configured to be driven by the motor to move air, a printed circuit board mounted in the housing, and a heater mounted in the housing so as to be connected to the printed circuit board and configured to heat the air flowing through the housing.

10 Claims, 8 Drawing Sheets

(56) References Cited

U.S. PATENT DOCUMENTS

| | | | |
|---|---|---|---|
| 2005/0253425 A1* | 11/2005 | Asada | B60N 2/5664 297/180.1 |
| 2007/0114868 A1* | 5/2007 | Horng | F04D 29/325 310/156.32 |
| 2008/0157634 A1* | 7/2008 | Sekiguchi | H02K 1/182 310/90 |
| 2009/0026813 A1* | 1/2009 | Lofy | B60N 2/5635 165/104.31 |
| 2013/0189130 A1* | 7/2013 | Chang | F04D 25/062 417/354 |
| 2015/0093271 A1* | 4/2015 | Hiromoto | F04D 25/06 310/156.43 |
| 2015/0118081 A1* | 4/2015 | Tsai | F04D 25/026 417/420 |
| 2016/0001686 A1* | 1/2016 | Jung | B60N 2/5657 297/180.14 |
| 2016/0341202 A1* | 11/2016 | Chai | F04D 13/0606 |
| 2017/0074286 A1* | 3/2017 | Kreidler | H02K 7/14 |
| 2017/0248146 A1* | 8/2017 | Wheeler | H02K 1/2793 |
| 2020/0282881 A1* | 9/2020 | Kim | H02K 11/33 |
| 2022/0227200 A1* | 7/2022 | Hildebrand | B60H 1/00328 |
| 2022/0340058 A1* | 10/2022 | Lim | F04D 29/403 |

FOREIGN PATENT DOCUMENTS

| | | |
|---|---|---|
| KR | 20130053470 A | 5/2013 |
| KR | 10-1280775 B1 | 7/2013 |

\* cited by examiner

BLOWER FOR VENTILATION SEAT HAVING WARM-AIR-BLOWING FUNCTION AND VEHICULAR VENTILATION SEAT INCLUDING THE SAME

CROSS-REFERENCE TO RELATED APPLICATION

This application claims the priority benefit of Korean Patent Application No. 10-2021-0051749, filed on Apr. 21, 2021 in the Korean Intellectual Property Office, the disclosure of which is incorporated herein by reference.

BACKGROUND OF THE INVENTION

1. Field of the Invention

The present invention relates to a blower for a ventilation seat having a warm-air-blowing function and a vehicular ventilation seat including the same, and more particularly to a blower for a ventilation seat having a warm-air-blowing function, which is capable of making warm air flow through the seat without using a heat mat, and a vehicular ventilation seat including the same.

2. Description of the Related Art

In general, a vehicle is equipped with a cooling/heating system composed of an air conditioner and a heater. However, in the summer or winter, an occupant receives the heat or the cold from a seat of the vehicle even if the cooling/heating system is operated, and thus the ride comfort of the occupant is deteriorated.

In order to solve this problem, there have been developed a vehicular ventilation seat in which a separate ventilation device is mounted and a vehicular seat in which a heat mat is mounted.

When an occupant wants to cool down, a ventilation seat is operated to suction indoor air in a vehicle and then to discharge the air toward the occupant sitting thereon, with the result that the occupant can feel the chilling effect thereof. When the occupant wants to warm up, a heat mat mounted in the seat is heated to transfer heat to the seat, with the result that the occupant can feel the heat.

In general, a heat mat mounted in a seat in order to provide heat employs a heating wire, which generates heat upon application of power thereto.

The heating wire is a heating element made of copper, and is applied to a seat cushion and a seatback of a vehicle. When the heating wire is operated at maximum efficiency, a maximum current of about 10 A flows through the heating wire. This corresponds to maximum consumption of power of 130 W. That is, 500 W or more of power is consumed in a vehicle. This accounts for a large portion of power consumption in a vehicle.

In the recent trend whereby internal combustion engine vehicles are being replaced with electric vehicles, a seat provided with a heat mat, which consumes a large amount of power, is the main cause of power consumption in electric vehicles.

In addition, in a seat cushion to which a heat mat is applied, there may be a portion that does not contact the occupant's body, thereby unnecessarily consuming power.

In addition, due to the structural characteristics of the heat mat, when the heating wire is damaged during a process of assembling the seat or during use by the occupant, there is a risk of a fire. Particularly, fire caused by the heating wire while the vehicle is moving may cause a serious injury to the occupant. However, the structural characteristics of the heat mat make it impossible to completely eliminate the risk of a fire.

The information disclosed in this Background of the Invention section is only for enhancement of understanding of the general background of the invention, and should not be taken as an acknowledgement or any form of suggestion that this information forms the related art already known to a person skilled in the art.

SUMMARY OF THE INVENTION

Therefore, the present invention has been made in view of the above problems, and it is an object of the present invention to provide a blower for a ventilation seat having a warm-air-blowing function, which is capable of making warm air flow through the seat without using a conventional heat mat used for a vehicular seat, and a vehicular ventilation seat including the same.

In accordance with an aspect of the present invention, the above and other objects can be accomplished by the provision of a blower for a ventilation seat having a warm-air-blowing function, which moves air supplied to the ventilation seat for a vehicle. The blower includes a housing having an accommodation space formed therein and including an inlet receiving air and an outlet discharging air, a motor mounted in the housing, an impeller mounted in the housing and configured to be driven by the motor to move air, a printed circuit board mounted in the housing, and a heater mounted in the housing so as to be connected to the printed circuit board and configured to heat the air flowing through the housing.

The housing may include a lower housing and an upper housing coupled to the lower housing, and the heater may include a lower heater mounted on the inner wall of the lower housing and an upper heater mounted on the inner wall of the upper housing.

The lower housing may include at least one lower connection protrusion protruding from the inner wall thereof, the lower heater may have at least one lower connection hole formed therein, and the lower connection protrusion may be inserted into and coupled to the lower connection hole. The upper housing may include at least one upper connection protrusion protruding from the inner wall thereof, the upper heater may have at least one upper connection hole formed therein, and the upper connection protrusion may be inserted into and coupled to the upper connection hole.

The lower heater may include a pair of power connection terminals, and the pair of power connection terminals may be connected to the printed circuit board.

The lower heater may be formed in the shape of a circular band, the pair of power connection terminals may be spaced a predetermined distance apart from each other, and the lower heater may include a disconnection portion disconnecting the pair of power connection terminals from each other.

The lower heater may include a pair of lower flanges extending therefrom, and the upper heater may include a pair of upper flanges extending therefrom. The lower heater and the upper heater may be electrically connected to each other through contact between each of the pair of lower flanges and a corresponding one of the pair of upper flanges.

Each of the pair of lower flanges may include a lower embossed portion formed on the contact surface thereof facing a corresponding one of the pair of upper flanges, and may be electrically connected to a corresponding one of the pair of upper flanges via the lower embossed portion.

The inlet may be disposed on a portion of the inner wall of the upper housing, and the upper heater may be disposed one another portion of the inner wall of the upper housing other than the portion on which the inlet is formed.

The blower may further include a temperature sensor provided in the housing in order to measure the temperature of the air flowing through the housing in real time.

In accordance with another aspect of the present invention, there is provided a vehicular ventilation seat including a seat unit having a plurality of air discharge holes formed in the surface thereof, a blower including an impeller configured to suction indoor air in a vehicle and to move the air to the plurality of air discharge holes in the seat unit and a heater configured to heat the air flowing through the blower, a controller configured to control the operation of the blower and to control the operation of the heater according to an air-blowing mode, and an input unit configured to receive an operation signal to be transmitted to the controller.

The input unit may enable an occupant to select and input a cooling mode or a heating mode as the air-blowing mode. When the air-blowing mode input to the input unit is the cooling mode, the controller may operate only the impeller of the blower, and when the air-blowing mode is the heating mode, the controller may operate the impeller of the blower and simultaneously heat the heater.

The blower may be provided therein with a temperature sensor measuring the temperature of the air flowing through the blower. Even if the air-blowing mode input to the input unit is the heating mode, when the temperature of air measured by the temperature sensor is equal to or higher than a predetermined temperature, the controller may stop heating the heater.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to preferred embodiments of the present invention, examples of which are illustrated in the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. Wherever possible, the same reference numbers will be used throughout the drawings to refer to the same or like parts.

Figure 1:
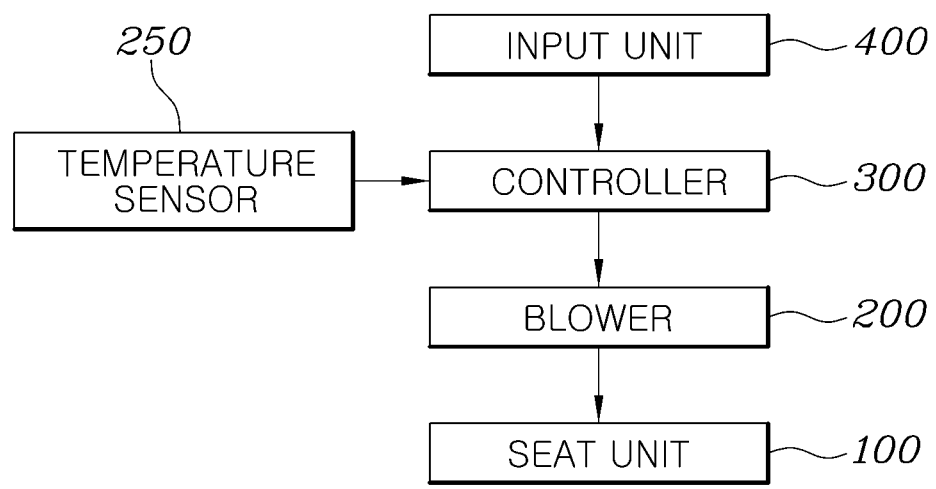
FIG. 1 is a block diagram showing the configuration of a vehicular ventilation seat according to an embodiment of the present invention.

FIG. 1 is a block diagram showing the configuration of a vehicular ventilation seat according to an embodiment of the present invention.

Figure 2A:
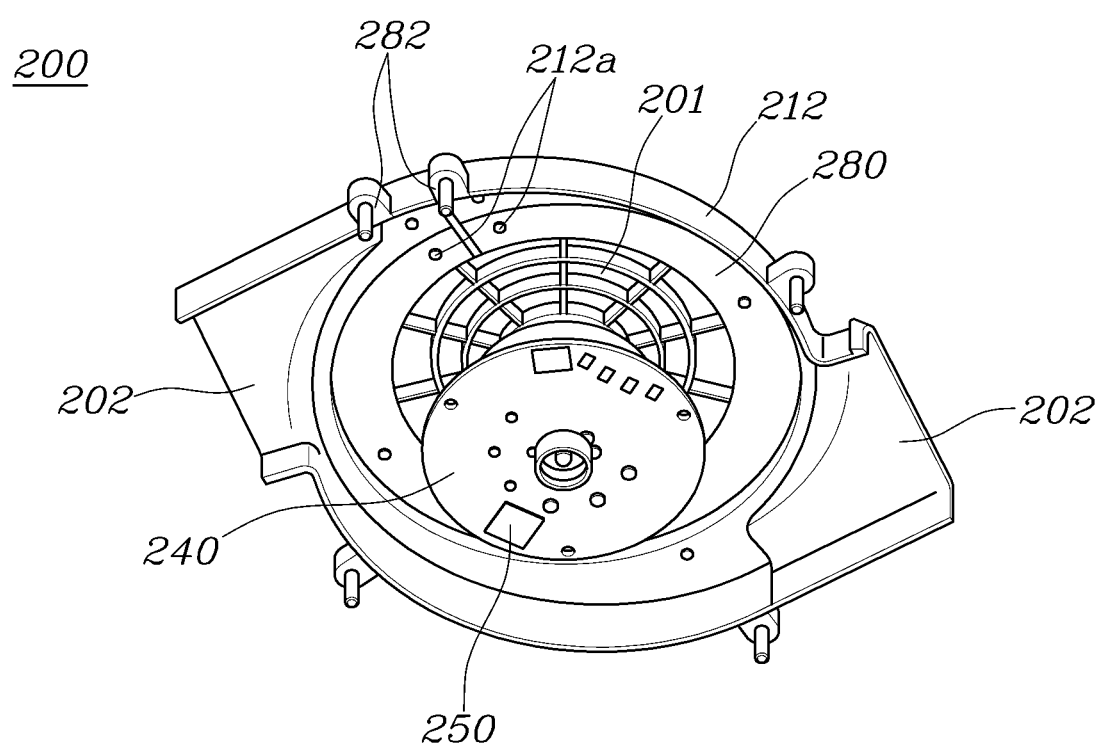
FIG. 2A is a perspective view of a portion of a blower for a ventilation seat according to an embodiment of the present invention and FIG. 2B is an exploded perspective view of a blower for a ventilation seat according to an embodiment of the present invention.
Figure 2B:
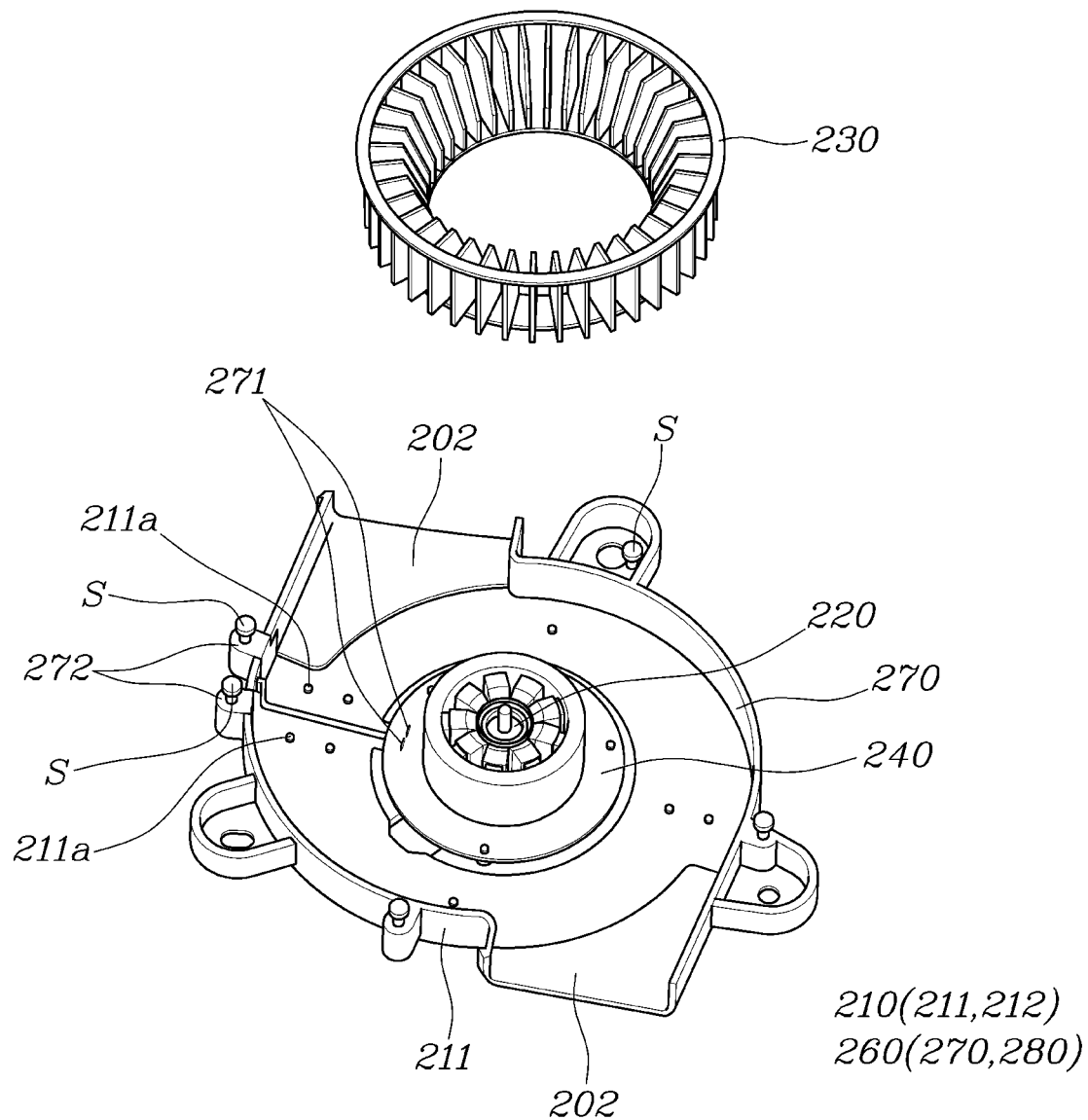
Figure 3:
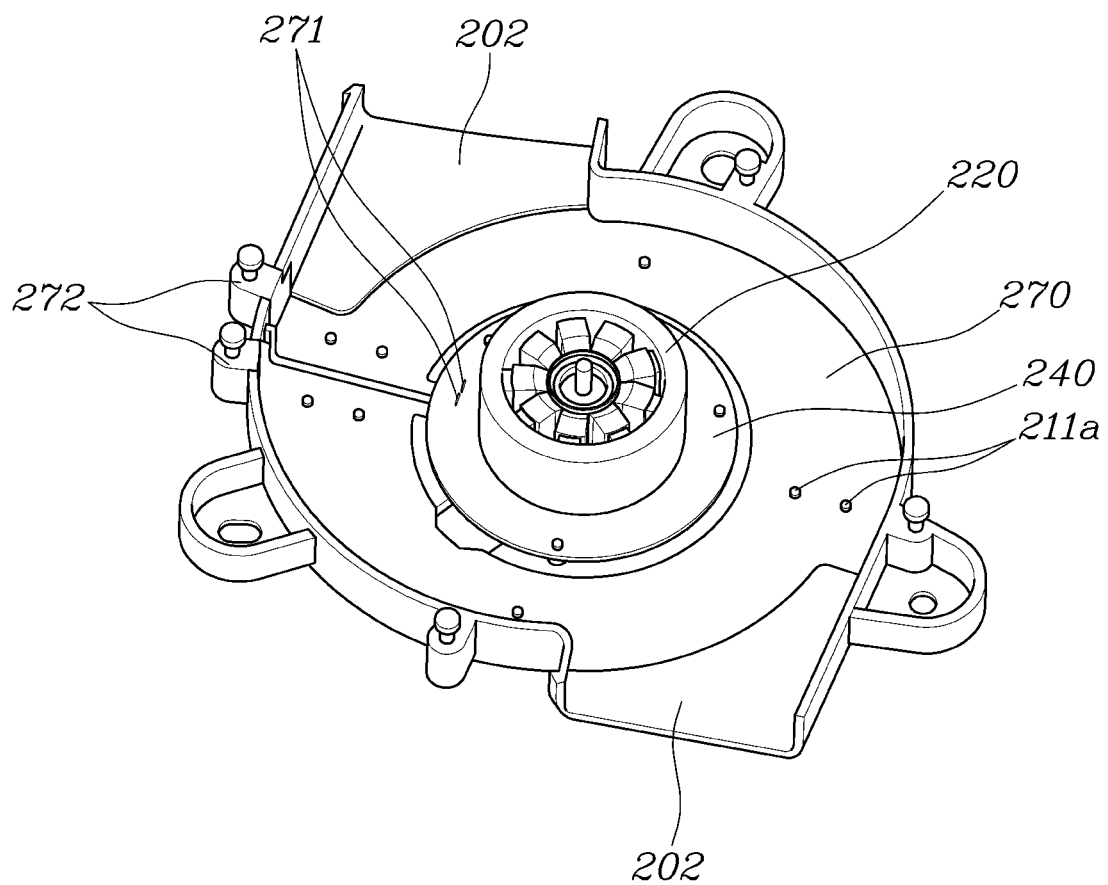
FIG. 3 is a perspective view of a lower housing and components mounted therein according to an embodiment of the present invention.
Figure 4A:
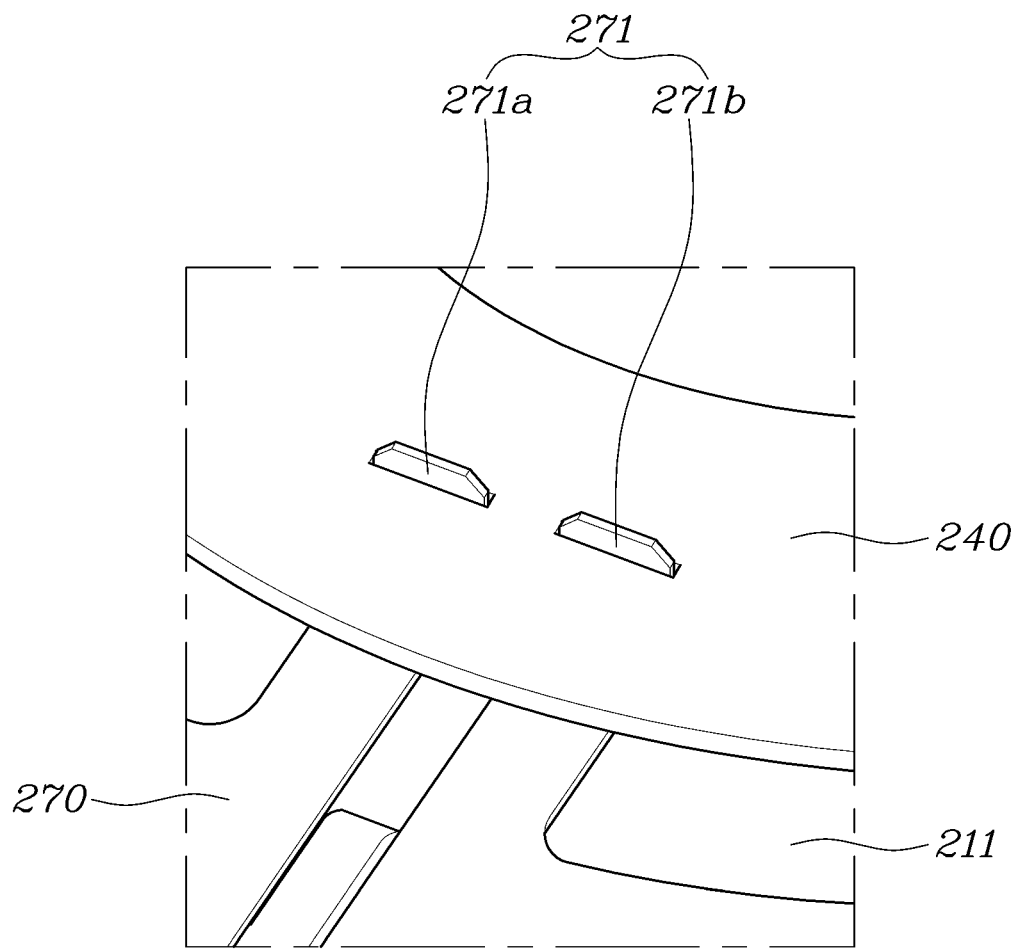
FIGS. 4A to 4C are perspective views of a blower for a ventilation seat according to an embodiment of the present invention.
Figure 4B:
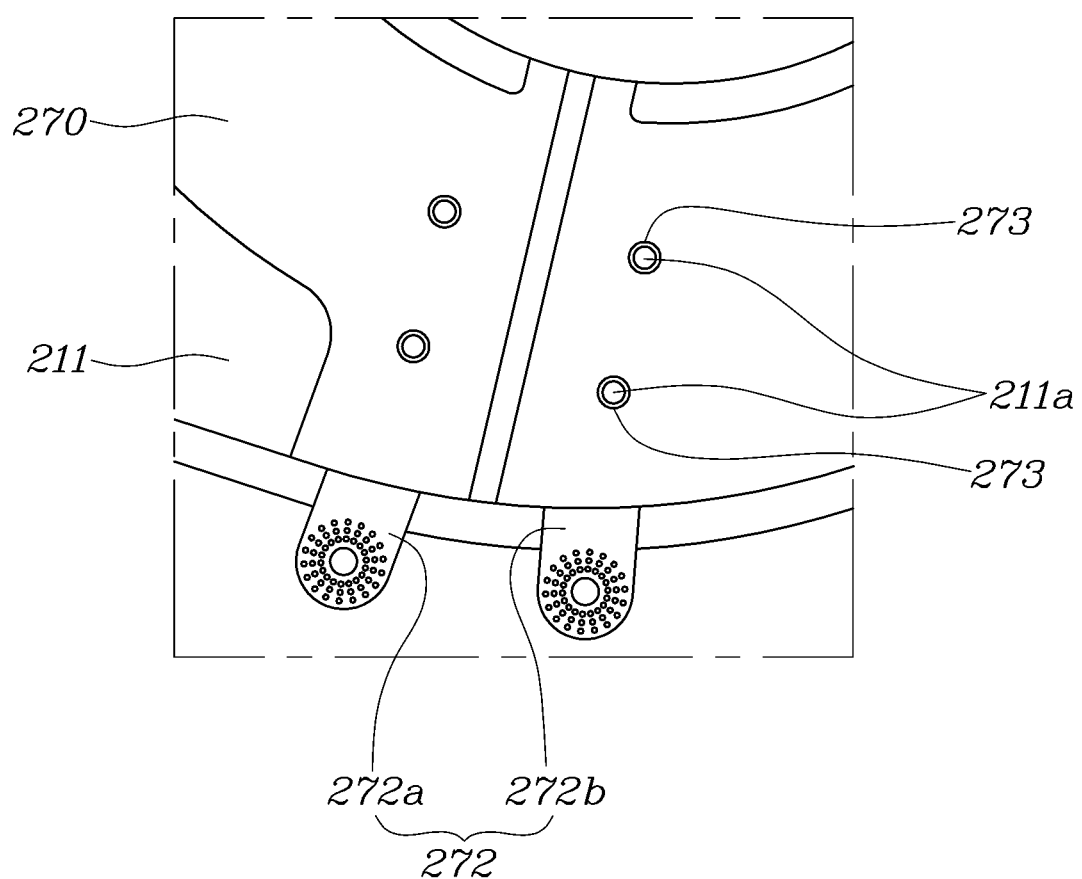
Figure 4C:
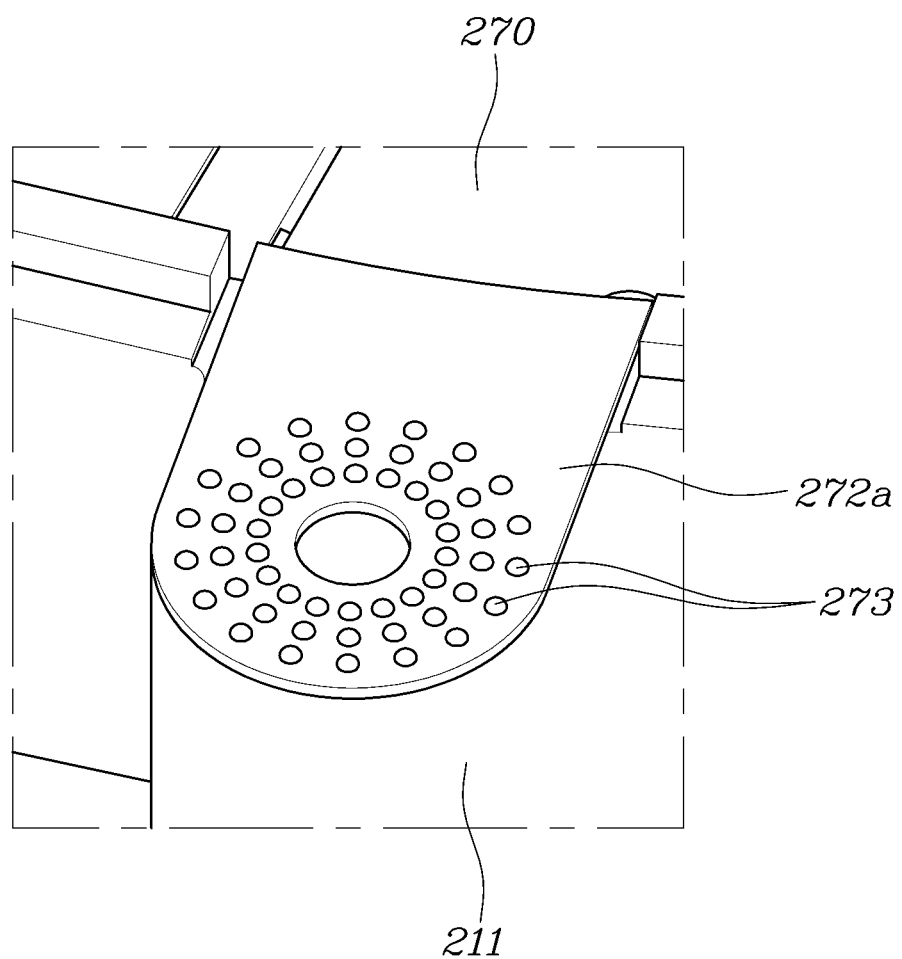
Figure 5:
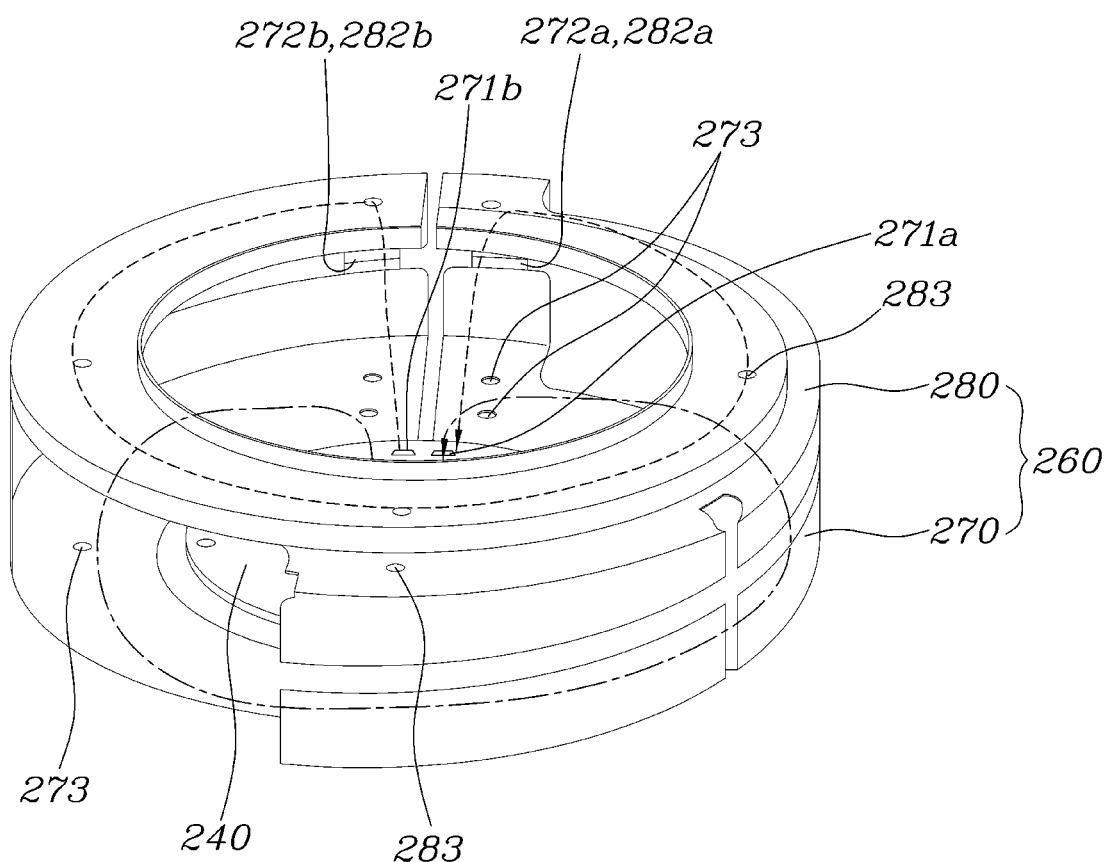
FIG. 5 is a perspective view of a heater according to an embodiment of the present invention.

FIG. 2A is a perspective view of a portion of a blower for a ventilation seat according to an embodiment of the present invention and FIG. 2B is an exploded perspective view of a blower for a ventilation seat according to an embodiment of the present invention. FIG. 3 is a perspective view of a lower housing and components mounted therein according to an embodiment of the present invention. FIGS. 4A to 4C are perspective views of a blower for a ventilation seat according to an embodiment of the present invention. FIG. 5 is a perspective view of a heater according to an embodiment of the present invention.

As shown in FIG. 1, a vehicular ventilation seat according to an embodiment of the present invention includes a seat unit 100, which has a plurality of air discharge holes formed in the surface thereof, a blower 200, which is provided with an impeller 230 for suctioning indoor air in the vehicle and moving the air to the air discharge holes in the seat unit 100 and with a heater 260 for heating the air flowing through the blower, a controller 300, which controls the operation of the blower 200 and controls the operation of the heater 260 according to an air-blowing mode, and an input unit 400, which receives an operation signal to be transmitted to the controller 300.

The seat unit 100 is a seat applied to common vehicles, and includes a seat cushion and a seatback. A plurality of air discharge holes is formed in the surface of the seat cushion and the surface of the seatback. When the blower 200 is operated, temperature-adjusted air is discharged through the air discharge holes from the interior of the seat cushion and the interior of the seatback.

The seat unit 100 is not provided with a heat mat employing a heating wire, which is conventionally used to provide heat to a seat cushion and a seatback.

The blower 200 suctions indoor air in the vehicle, and then moves the air to the seat unit. The blower 200 is provided with the heater 260 for selectively heating the air flowing therethrough. A detailed description of the configuration and operation of the blower 200 will be made later.

The controller 300 controls the operation of the impeller 230 and the heater 260, which are provided at the blower 200, in response to an operation signal transmitted from the input unit 400.

The controller 300 according to the exemplary embodiment of the present invention may be implemented through a processor (not shown) configured to execute the operation to be described below using nonvolatile memory (not shown), which is configured to store an algorithm for controlling the operation of various components of a vehicle or data related to a software command for executing the algorithm, and data stored in the memory. Here, the memory and the processor may be implemented as individual chips. Alternatively, the memory and the processor may be implemented as a single integrated chip. The processor may alternatively take the form of one or more processors.

The input unit 400 is a device to which an operation signal pertaining to whether to operate the blower 200 is input depending on selection by the occupant. The input unit 400 may be implemented as, for example, a switch, which is mounted in the vehicle and is manipulated by the occupant. The input unit 400 is not limited to a switch, and may be implemented in any of various other forms, so long as the same is capable of transmitting a signal related to selection by the occupant to the controller 300.

In addition, the input unit 400 enables the occupant to select and input a cooling mode or a heating mode as the air-blowing mode.

When the air-blowing mode input to the input unit 400 is the cooling mode, the controller 300 operates only the impeller 230 of the blower 200. Thereby, air in the vehicle is suctioned into the blower 200 and is then discharged to the occupant through the air discharge holes formed in the seat unit 100 by the operation of the impeller 230. Accordingly, the occupant experiences improved ride comfort due to the cool air discharged through the air discharge holes formed in the seat unit 100.

When the air-blowing mode input to the input unit 400 is the heating mode, the controller 300 operates the impeller 230 of the blower 200, and at the same time, heats the heater 260. Thereby, the air in the vehicle is suctioned into the blower 200, is heated by the heater 260, and is then discharged to the occupant through the air discharge holes formed in the seat unit 100 by the operation of the impeller 230. Accordingly, the occupant experiences improved ride comfort due to the warm air discharged through the air discharge holes formed in the seat unit 100.

In addition, the blower 200 may be provided with a temperature sensor 250 for measuring the temperature of the air flowing through the blower.

Even if the air-blowing mode input to the input unit 400 is the heating mode, when the temperature of the air measured by the temperature sensor is equal to or higher than a predetermined temperature, the controller 300 stops heating the heater 260, thereby preventing the air to be discharged through the seat unit 100 from being heated excessively.

Hereinafter, the blower according to an embodiment of the present invention will be described in detail with reference to the accompanying drawings.

As shown in FIGS. 2 to 5, the blower 200 for a ventilation seat having a warm-air-blowing function according to an embodiment of the present invention is a blower for moving air that is supplied to a vehicular ventilation seat. The blower 200 includes a housing 210, which has an accommodation space formed therein, an inlet 201 into which air is introduced, and outlets 202 from which air is discharged, a motor 220, which is mounted in the housing 210, an impeller 230, which is mounted in the housing 210 and is operated by the motor 220 2 0 to move air, a printed circuit board 240, which is mounted in the housing 210, and a heater 260, which is mounted in the housing 210 so as to be connected to the printed circuit board 240 in order to heat the air flowing through the housing 210.

The housing 210 has an accommodation space formed therein. The air in the vehicle is introduced into the housing 210 through the inlet 201, and is then moved to the air discharge holes formed in the seat unit 100 through the outlets 202.

The housing 210 may be divided into a lower housing 211 and an upper housing 212. The lower housing 211 and the upper housing 212 may be coupled to each other by fastening a screw S thereto. The lower housing 211 and the upper housing 212 are formed so as to be substantially symmetrical to each other.

As shown in FIG. 2A, in the housing 210 according to this embodiment, the inlet 201, into which air in the vehicle is introduced, is formed in the center of the upper housing 212 in the form of a grill.

The outlets 202 are formed through two opposite side portions of each of the pair of housings 211 and 212. In detail, the outlets 202 are partially formed through two opposite side portions of each of the lower housing 211 and the upper housing 212. Accordingly, the outlets 202 are completely defined when the lower housing 211 and the upper housing 212 are coupled to each other.

The motor 220 and the impeller 230 are mounted in the housing 210. When the impeller 230 is operated by the motor 220, the air in the vehicle is suctioned into the housing 210 through the inlet 201, and is then discharged through the outlets 202. Neither the motor 220 nor the impeller 230 is limited to any specific form. Each of the motor 220 and the impeller 230 may be implemented in any of various forms depending on the shapes and the formation positions of the inlet 201 and the outlets 202. According to this embodiment, the motor 220 is disposed at the center of the housing 210, and the impeller 230, which has a cylindrical shape, is mounted so as to surround the motor 220.

The printed circuit board 240 is mounted in the housing 210. The printed circuit board 240 transmits power to the heater 260, and controls the operation of the heater 260. The printed circuit board 240 may be formed in any of various shapes, so long as the same does not interfere with the shape of the housing 210 or the operation of other components provided in the housing 210. According to this embodiment, the printed circuit board 240 may be formed in a disc shape, and may be mounted so as to surround the motor 220.

The temperature sensor 250 may be mounted on the printed circuit board 240 in order to measure the temperature of the air flowing through the housing 210 in real time.

The heater 260 is mounted in the housing 210 so as to be electrically connected to the printed circuit board 240, and heats the air flowing through the housing 210.

As the area of contact of the heater 260 with the air flowing through the housing 210 increases, the heater 260 is capable of heating the air more rapidly. Therefore, it is preferable for the heater 260 to be mounted on the inner wall of the housing 210.

Accordingly, it is preferable for the heater 260 to be formed so as to correspond to the division of the housing 210 into the lower housing 211 and the upper housing 212.

For example, the heater 260 may be divided into a lower heater 270, which is mounted on the inner wall of the lower housing 211, and an upper heater 280, which is mounted on the inner wall of the upper housing 212. Therefore, the lower heater 270 is formed in a shape corresponding to the shape of the inner wall of the lower housing 211, and the upper heater 280 is formed in a shape corresponding to the shape of the inner wall of the upper housing 212.

In this case, it is preferable for the lower heater 270 to be disposed in a region of the inner wall of the lower housing 211 other than the regions in which the motor 220, the printed circuit board 240, and the impeller 230 are mounted.

In addition, it is preferable for the upper heater 280 to be disposed in a region of the inner wall of the upper housing 212 other than the region in which the inlet 201 is formed.

Each of the lower heater 270 and the upper heater 280 may be formed in the shape of a circular band.

In order to prevent disconnection of components and positional deviation of components due to vibration during operation of the blower 200, it is preferable for the lower heater 270 and the upper heater 280 to be in close contact with and securely fixed to the lower housing 211 and the upper housing 212, respectively.

To this end, according to this embodiment, at least one lower connection protrusion 211a is formed so as to protrude from the inner wall of the lower housing 211, and at least one lower connection hole 273, into which the lower connection protrusion 211a is inserted, is formed in the lower heater 270. Preferably, in the state in which the lower connection protrusion 211a is inserted into the lower connection hole 273, the lower connection protrusion 211a is welded and fixed to the lower connection hole 273 using a heat press.

In addition, at least one upper connection protrusion 212a is formed so as to protrude from the inner wall of the upper housing 212, and at least one upper connection hole 283, into which the upper connection protrusion 212a is inserted, is formed in the upper heater 280. Preferably, in the state in which the upper connection protrusion 212a is inserted into the upper connection hole 283, the upper connection protrusion 212a is welded and fixed to the upper connection hole 283 using a heat press.

However, the method whereby the lower heater 270 and the upper heater 280 are fixed to each other is not limited to the above-described method. Any of various other fixing methods may be used in order to securely fix the lower heater 270 and the upper heater 280 to the lower housing 211 and the upper housing 212, respectively.

The lower heater 270 and the upper heater 280, which together constitute the heater 260, are electrically connected to the printed circuit board 240 in order to be operated.

The lower heater 270, which is mounted in the lower housing 211 accommodating the printed circuit board 240, is provided with a pair of power connection terminals 271, which are connected to the printed circuit board 240. The pair of power connection terminals 271 includes a (+) connection terminal 271b and a (−) connection terminal 271a. As shown in FIG. 4A, the (+) connection terminal 271b and the (−) connection terminal 271a are electrically connected to the printed circuit board 240 through soldering.

The pair of power connection terminals 271 provided at the lower heater 270 is formed such that the (+) connection terminal 271b and the (−) connection terminal 271a are spaced a predetermined distance apart from each other in order to effectively induce the flow of current and thus to improve the heat generation efficiency of the heater 260. Particularly, as shown in FIG. 4B, in order to induce the flow of current in one direction, the lower heater 270 is provided with a disconnection portion for disconnecting the pair of power connection terminals 271 from each other.

The lower heater 270 and the upper heater 280 are electrically connected to each other in order to simultaneously share the power applied to the (+) connection terminal 271b and the (−) connection terminal 271a provided at the lower heater 270.

To this end, the lower heater 270 is provided with a pair of lower flanges 272 extending therefrom, and the upper heater 280 is provided with a pair of upper flanges 282 extending therefrom. The lower heater 270 and the upper heater 280 are electrically connected to each other through contact between each of the pair of lower flanges 272 and a corresponding one of the pair of upper flanges 282.

In this case, in order to increase the area of contact between the pair of lower flanges 272 and the pair of upper flanges 282, as shown in FIG. 4C, each of the lower flanges 272 is provided with lower embossed portions 274 on the contact surface thereof that faces a corresponding one of the upper flanges 282. The lower flanges 272 are electrically connected to the upper flanges 282 via the lower embossed portions 274. In addition, each of the upper flanges 282 may also be provided with upper embossed portions.

For example, the lower embossed portions 274 formed on the lower flanges 272 may be a plurality of protrusions. Similarly, the upper embossed portions formed on the upper flanges 282 may be a plurality of protrusions. In this case, the lower flanges 272 and the upper flanges 282 may be in point contact, rather than surface contact, with each other via the protrusion-type lower embossed portions 274 of the lower flanges 272 and the protrusion-type upper embossed portions of the upper flanges 282, thereby realizing stable electrical connection therebetween.

As described above, the lower heater 270 and the upper heater 280 are electrically connected to the printed circuit board 240 via the (+) connection terminal 271b and the (−) connection terminal 271a, and are electrically connected to each other through contact between the pair of lower flanges 272 and the pair of upper flanges 282. Accordingly, the current supplied from the printed circuit board 240 is passed to the lower heater 270 and the upper heater 280, so the lower heater 270 and the upper heater 280 generate heat.

For example, as shown in FIG. 5, a portion of the power applied to the (+) connection terminal 271b, which is connected to the printed circuit board 240, is sequentially applied to the lower heater 270 and to the (−) connection terminal 271a. In addition, the remainder of the power applied to the (+) connection terminal 271b is sequentially applied to the upper heater 280 via the (+)-side lower flange 272B and the (+)-side upper flange 282B, to the lower heater 270 via the (−)-side upper flange 282A and the (−)-side lower flange 272A, and to the (−) connection terminal 271a.

In this way, the flow of current to the lower heater 270 and the upper heater 280 is induced in one direction. Accordingly, the flow of current may be effectively induced to the lower heater 270 and the upper heater 280. As a result, the heat generation efficiency of the lower heater 270 and the upper heater 280 may be increased.

As is apparent from the above description, according to the embodiment of the present invention, the blower for a ventilation seat is provided therein with a device capable of heating air, rather than a conventional heat mat used for a vehicular seat. Accordingly, cool air or warm air is selectively discharged to an occupant as selected by the occupant, thereby improving the ride comfort of the occupant.

In addition, since a heat mat is not used, it may be possible to prevent an accident attributable to damage to a heating wire used for a heat mat.

In addition, since a heat mat is not used, the production cost of a seat and the number of production processes may be reduced.

In addition, compared to when a heat mat is used, power consumption may be reduced, and accordingly, problems related to battery power consumption in electric vehicles may be alleviated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A blower for a ventilation seat having a warm-air-blowing function, wherein the blower moves air supplied to the ventilation seat for a vehicle, the blower comprising:
   a housing including an accommodation space formed therein and an inlet for receiving air and an outlet for discharging air;

a motor mounted in the housing;
an impeller mounted in the housing and configured to be driven by the motor to move air;
a printed circuit board mounted in the housing; and
a heater mounted in the housing so as to be connected to the printed circuit board and configured to heat air flowing through the housing,
wherein the housing includes a lower housing and an upper housing coupled to the lower housing,
wherein the heater includes a lower heater mounted on an inner wall of the lower housing and an upper heater mounted on an inner wall of the upper housing,
wherein the lower heater includes a pair of lower flanges extending therefrom,
wherein the upper heater includes a pair of upper flanges extending therefrom, and
wherein the lower heater and the upper heater are electrically connected to each other through contact between a respective one of the pair of the lower flanges and a respective one of the pair of the upper flanges.

2. The blower according to claim 1, wherein the lower heater includes a pair of power connection terminals, and the pair of power connection terminals is connected to the printed circuit board.

3. The blower according to claim 2, wherein the lower heater has a shape of a circular band,
wherein the pair of power connection terminals is spaced a predetermined distance apart from each other, and
wherein the lower heater includes a disconnection portion for disconnecting the pair of power connection terminals from each other.

4. The blower according to claim 1, wherein the respective one of the pair of lower flanges includes a lower embossed portion formed on a contact surface thereof facing the respective one of the pair of upper flanges, and is electrically connected to the respective one of the pair of upper flanges via the lower embossed portion.

5. The blower according to claim 1, wherein the inlet is disposed on a portion of the inner wall of the upper housing, and
wherein the upper heater is disposed on another portion of the inner wall of the upper housing other than the portion on which the inlet is disposed.

6. The blower according to claim 1, further comprising:
a temperature sensor disposed in the housing and configured to measure a temperature of the air flowing through the housing in real time.

7. A vehicular ventilation seat comprising:
a seat assembly including a plurality of air discharge holes disposed on a surface thereof;
a blower including a housing, an impeller configured to suction indoor air in a vehicle and to move air to the plurality of air discharge holes in the seat assembly and a heater configured to heat air flowing through the blower;
a processor configured to control operation of the blower and to control operation of the heater according to an air-blowing mode; and
a switch configured to receive an operation signal to be transmitted to the processor,
wherein the housing includes a lower housing and an upper housing coupled to the lower housing,
wherein the heater includes a lower heater mounted on an inner wall of the lower housing and an upper heater mounted on an inner wall of the upper housing,
wherein the lower heater includes a pair of lower flanges extending therefrom,
wherein the upper heater includes a pair of upper flanges extending therefrom, and
wherein the lower heater and the upper heater are electrically connected to each other through contact between a respective one of the pair of lower flanges and a respective one of the pair of upper flanges.

8. The vehicular ventilation seat according to claim 7, wherein the air-blowing mode includes a cooling mode and a heating mode, and the switch enables an occupant to select the cooling mode or the heating mode, and
wherein the processor operates only the impeller of the blower for the cooling mode, and the processor simultaneously operates the impeller of the blower and the heater.

9. The vehicular ventilation seat according to claim 8, wherein the blower includes a temperature sensor for measuring a temperature of the air flowing through the blower, and
wherein, even if the heating mode is selected, when the temperature of air measured by the temperature sensor is equal to or higher than a predetermined temperature, the processor stops operating the heater.

10. A blower for a ventilation seat having a warm-air-blowing function, wherein the blower moves air supplied to the ventilation seat for a vehicle, the blower comprising:
a housing including an accommodation space formed therein and an inlet for receiving air and an outlet for discharging air;
a motor mounted in the housing;
an impeller mounted in the housing and configured to be driven by the motor to move air;
a printed circuit board mounted in the housing; and
a heater mounted in the housing so as to be connected to the printed circuit board and configured to heat air flowing through the housing,
wherein the housing includes a lower housing and an upper housing coupled to the lower housing, and
wherein the heater includes a lower heater mounted on an inner wall of the lower housing and an upper heater mounted on an inner wall of the upper housing,
wherein the lower housing includes at least one lower connection protrusion protruding from the inner wall thereof, the lower heater has at least one lower connection hole formed therein, and the lower connection protrusion is inserted into and coupled to the lower connection hole, and
wherein the upper housing includes at least one upper connection protrusion protruding from the inner wall thereof, the upper heater has at least one upper connection hole formed therein, and the upper connection protrusion is inserted into and coupled to the upper connection hole.

* * * * *